US011025150B2

(12) United States Patent
Tang et al.

(10) Patent No.: US 11,025,150 B2
(45) Date of Patent: Jun. 1, 2021

(54) LINEAR VIBRATION MOTOR

(71) Applicant: AAC Acoustic Technologies (Shenzhen) Co., Ltd., Shenzhen (CN)

(72) Inventors: Yun Tang, Shenzhen (CN); Lubin Mao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 96 days.

(21) Appl. No.: 16/526,976

(22) Filed: Jul. 30, 2019

(65) Prior Publication Data

US 2020/0044544 A1 Feb. 6, 2020

(30) Foreign Application Priority Data

Aug. 3, 2018 (CN) ........................ 201810879689.8

(51) Int. Cl.
*H02K 33/00* (2006.01)
*H02K 33/18* (2006.01)

(52) U.S. Cl.
CPC .................................. *H02K 33/18* (2013.01)

(58) Field of Classification Search
CPC .............................. H02K 33/16; H02K 33/00
See application file for complete search history.

(56) References Cited

U.S. PATENT DOCUMENTS 5,682,132 A * 10/1997 Hiroyoshi ................ G08B 6/00 310/29
6,777,895 B2 * 8/2004 Shimoda ................ B06B 1/045 318/114
10,622,877 B2 * 4/2020 Kim ...................... H02K 33/16

FOREIGN PATENT DOCUMENTS

CN 207021881 B1 2/2018
CN 207321078 B1 5/2018

OTHER PUBLICATIONS

1st Office Action dated Nov. 11, 2019 by SIPO in related Chinese Patent Application No. 201810879689.8 (9 Pages).

* cited by examiner

*Primary Examiner* — Dang D Le
(74) *Attorney, Agent, or Firm* — W&G Law Group LLP

(57) ABSTRACT

Provided is a linear vibration motor, including: a housing; a vibration unit received in the housing, including a mass with a through hole and a permanent magnet mounted in the through hole; an elastic module; and a driving unit including an iron core fixedly mounted in the housing and passing through the through hole and a coil. The iron core includes an iron core body portion passing through the through hole and two iron core propping portions extending from two ends of the iron core body portion facing away from a central axis of the iron core body portion. The coil is wound on the iron core body portion. A side of the permanent magnet close to the coil and a side of the permanent magnet close to the mass have opposite magnetic polarities, and after the coil is energized, the two iron core propping portions have opposite magnetic polarities.

11 Claims, 7 Drawing Sheets

100

12
40
31 32 33 30
24
52
50
5121 512 5122 51
511
231 232 23
20
22
21
111
11

100

A-A

B-B

LINEAR VIBRATION MOTOR

TECHNICAL FIELD

The present disclosure relates to the field of vibration motors, and in particular to a linear vibration motor.

BACKGROUND

A linear vibration motor is a component that converts electric energy into mechanical energy by the generation principle of an electromagnetic force. The linear vibration motor is usually mounted in a portable mobile device to produce vibration feedback, such as vibration feedback of a mobile phone or vibration feedback of a game machine.

In the related art, the linear vibration motor includes a housing with a receiving space, a vibration unit received in the receiving space, an elastic module through which the vibration unit is suspended in the receiving space and a driving unit that drives the vibration unit to vibrate. The vibration unit includes a permanent magnet. The driving unit includes a coil. The linear vibration motor usually provides a driving force, only using a Lorentz force that is produced by interaction between magnetic fields of the coil and the permanent magnet, to drive the vibration unit to vibrate back and forth. However, since the driving force provided by the linear vibration motor is relatively small, the response time of vibration is relatively long.

Thus, it is necessary to provide a new linear vibration motor to solve the above-mentioned problem.

BRIEF DESCRIPTION OF THE DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be further illustrated with reference to the accompanying drawings and the embodiments.

Embodiment 1

Figure 1:
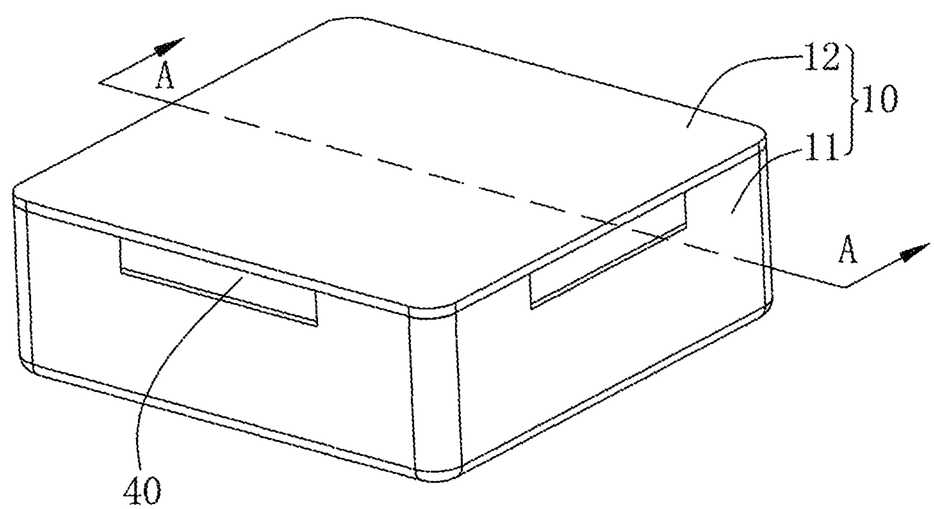
FIG. 1 is a perspective structural schematic view of a linear vibration motor according to Embodiment 1 of the present disclosure.
Figure 2:
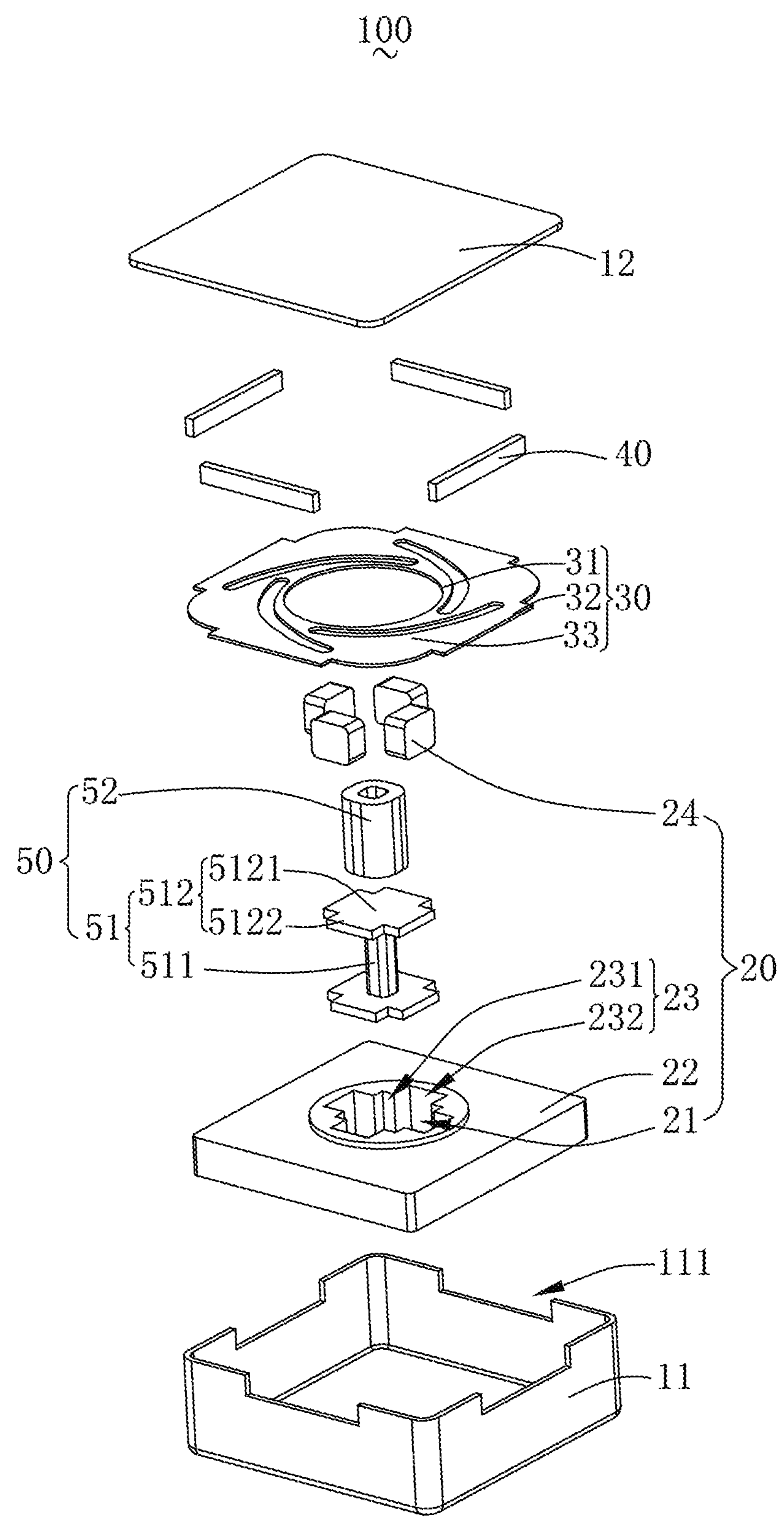
FIG. 2 is a exploded structural schematic view of the linear vibration motor according to Embodiment 1 of the present disclosure.
Figure 3:
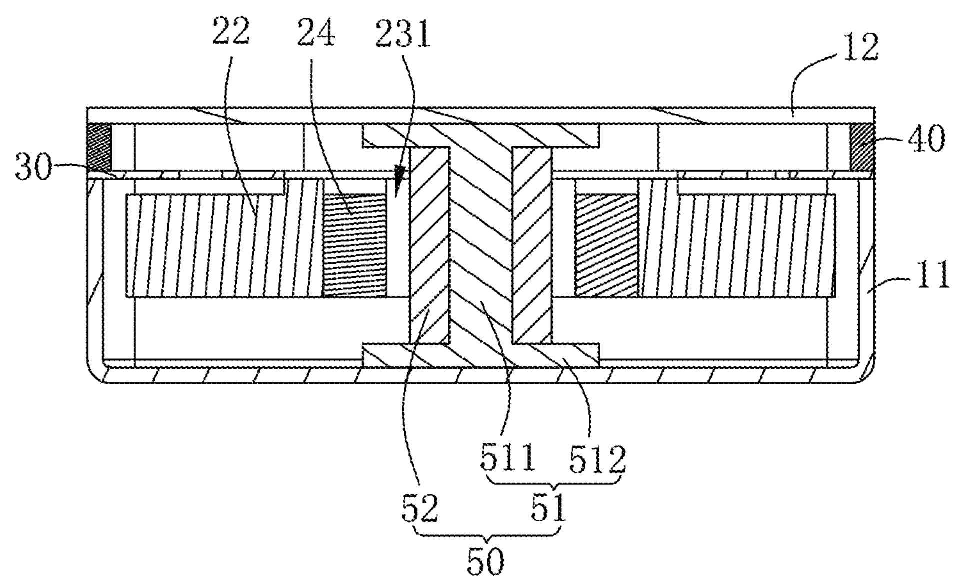
FIG. 3 is a cross-sectional view taken along A-A line of FIG. 1.

With reference to FIGS. 1-3, the present disclosure provides a linear vibration motor 100, including a housing 10 with a receiving space, a vibration unit 20 received in the receiving space, an elastic module 30 through which the vibration unit 20 is suspended in the receiving space, a baffle 40 disposed on the housing 10 and a driving unit 50 that drives the vibration unit 20 to vibrate.

The housing 10 includes a first housing 11 with a side wall and a second housing 12 that covers the first housing 11 to form the receiving space.

The vibration unit 20 includes a mass 22 with a through hole 21, a permanent-magnet holder 23 mounted in the through hole 21 and a permanent magnet 24 embedded into the permanent-magnet holder 23.

In particular, the mass 22 is made of a non-permeability magnetic material.

The permanent-magnet holder 23 includes a rectangular penetration hole 231 located in the center of the permanent-magnet holder 23 and a mounting groove 232 formed by recessing from an inner wall of the penetration hole 231 in a direction facing away from a central axis of the penetration hole 231. The permanent magnet 24 is embedded into the mounting groove 232.

The central axis of the penetration hole 231 and a central axis of the through hole 21 are located in the same straight line.

The number of the mounting grooves 232 is four, and the four mounting grooves 232 are respectively distributed in four inner walls of the penetration holes 231 in an array.

The number of the permanent magnets 24 is four, and the four permanent magnets 24 are disposed at intervals and correspondingly embedded into the four mounting grooves 232.

Preferably, the permanent magnet 24 is a magnet or a magnet ring.

One end of the elastic module 30 is fixed to the mass 22, and the other end thereof is connected to the baffle 40.

The elastic module 30 includes a fixed portion 31 fixedly connected to the mass 22, a connection portion 32 fixedly connected to the baffle 40 and a deformation portion 33 connecting the fixed portion 31 with the connection portion 32.

The baffle 40 is disposed on the side wall of the first housing 11 and connected to the elastic module 30 to fix the elastic module 30 to the first housing 11.

In particular, a groove 111 that receives the baffle 40 is formed in the side wall of the first housing 11. The connection portion 32 of the elastic module 30 is sandwiched between the baffle 40 and the bottom of the groove 111.

The number of the baffles 40 is four. Correspondingly, the number of the grooves 111 is also four. The four baffles 40 are respectively distributed in the grooves 111 in an array.

The driving unit 50 includes an iron core 51 fixedly mounted in the housing 10 and passing through the penetration hole 231 and a coil 52 wound on the iron core 51.

The iron core 51 includes an iron core body portion 511 passing through the penetration hole 231 and an iron core propping portion 512 formed by extending in a direction facing away from a central axis of the iron core body portion 511.

The number of the iron core propping portions 512 is two. The two iron core propping portions 512 are respectively located at two ends of the iron core body portion 511, spaced from the mass 22, and respectively propped against the first housing 11 and the second housing 12.

The iron core propping portion 512 includes a body portion 5121, which is connected to the iron core body portion 511 and is of a cuboid structure, and an extension portion 5122 formed by extending from a side edge of the body portion 5121 in a direction facing away from the center of the body portion 5121.

The central axis of the iron core body portion 511 and a central axis of the body portion 5121 are located in the same straight line.

The number of the extension portions 5122 is four. The four extension portions 5122 are respectively disposed at the four side edges of the body portion 5121 in an array.

An orthographic projection of the extension portion 5122 on the permanent magnet 24 is at least partially located on the permanent magnet 24.

The coil 52 is wound on the iron core body portion 511.

Figure 4:
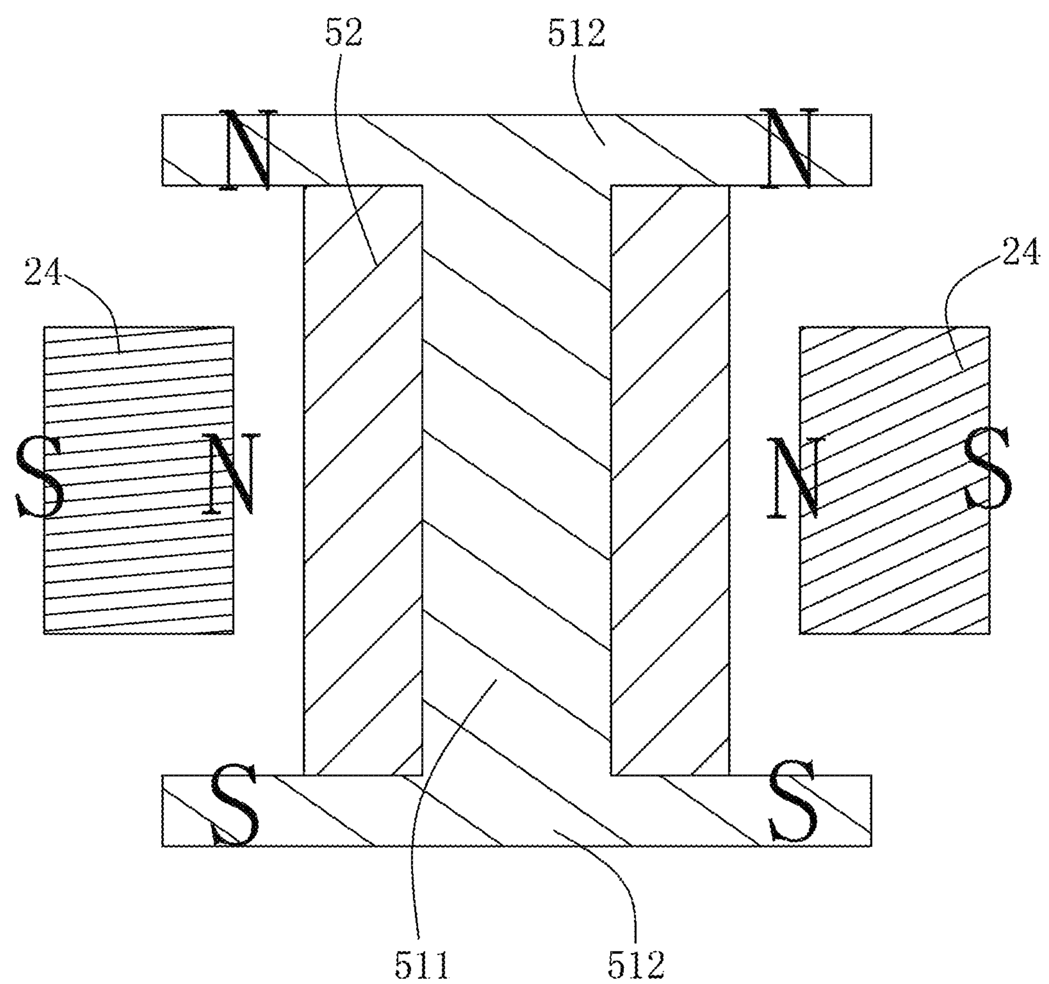
FIG. 4 is a structural schematic view of magnetic polarities of an iron core and a permanent magnet after the linear vibration motor according to the present disclosure is energized.

With reference to FIG. 4, a side of the permanent magnet 24 close to the coil 52 and a side of the permanent magnet 24 close to the mass 22 have opposite magnetic polarities.

In this embodiment, poles N of the four permanent magnets 24 are disposed oppositely. When the coil 52 is energized, magnetic lines of force of the permanent magnets 24 interact with the coil 52 to produce the Lorentz forces to drive the mass 22 to vibrate. In particular, when the coil 52 is energized, the iron core 51 is magnetized. For the convenience of illustration, after the coil 52 is energized, the iron core propping portion 512, close to the first housing 11, on the iron core 51 is set as the pole N, and the iron core propping portion 512, close to the second housing 12, on the iron core 51 is set as the pole S. At this time, the pole N of the iron core propping portion 512 attracts the permanent magnet 24, and the pole S of the iron core propping portion 512 repels the permanent magnet 24. A resultant acting force between the iron core 51 and the permanent magnet 24 faces the side facing away from the second housing 12. Thus, the mass 22 is pushed to vibrate in a direction facing away from the second housing 12.

Correspondingly, when the coil 52 is reversely energized, the resultant acting force between the iron core 51 and the permanent magnet 24 faces the side close to the second housing 12. Thus, the mass 22 is pushed to vibrate towards the second housing 12. The poles S of the four permanent magnets 24 may also be disposed oppositely, and in this case, the principles of forming a magnetic loop and producing an acting force with the iron core 51 are the same as the above descriptions.

As the iron core 51 and the coil 52 are provided, the linear vibration motor 100 can produce two driving forces for driving the mass 22 to vibrate, namely, the Lorentz force produced with the permanent magnet 24 after the coil 52 is energized and an electromagnetic force produced when the iron core 51 is magnetized and interacts with the permanent magnet 24 after the coil 52 is energized. Through superposition of the Lorentz force and the electromagnetic force, a relatively larger driving force can be obtained. Thus, the linear vibration motor 100 has a higher response speed.

Embodiment 2

This embodiment is basically the same as Embodiment 1, and their difference is as below.

Figure 5:
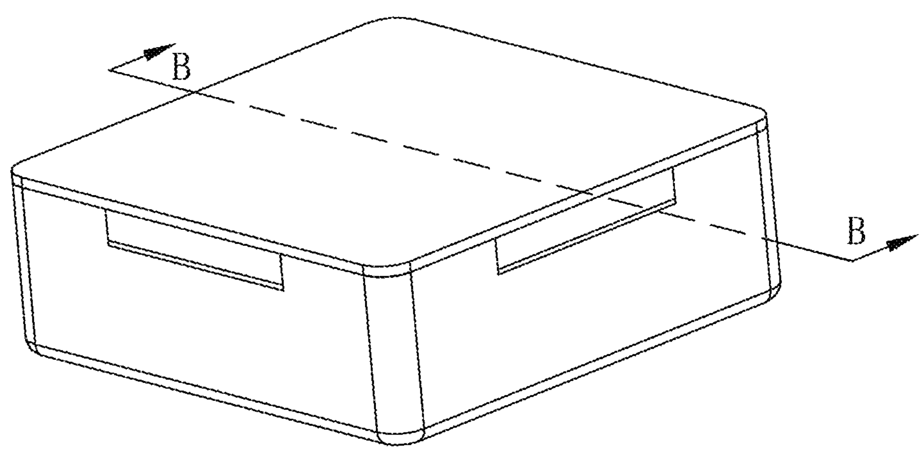
FIG. 5 is a perspective structural schematic view of a linear vibration motor according to Embodiment 2 of the present disclosure.
Figure 6:
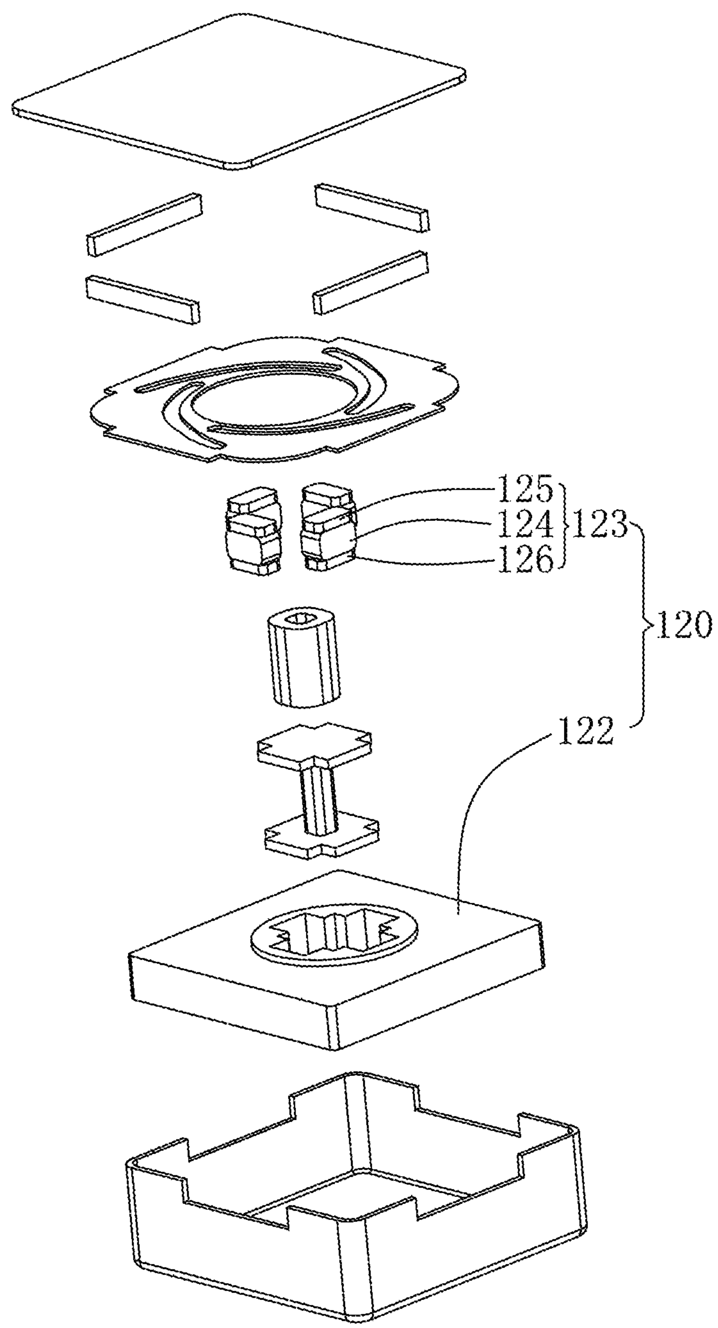
FIG. 6 is a exploded structural schematic view of the linear vibration motor according to Embodiment 2 of the present disclosure.
Figure 7:
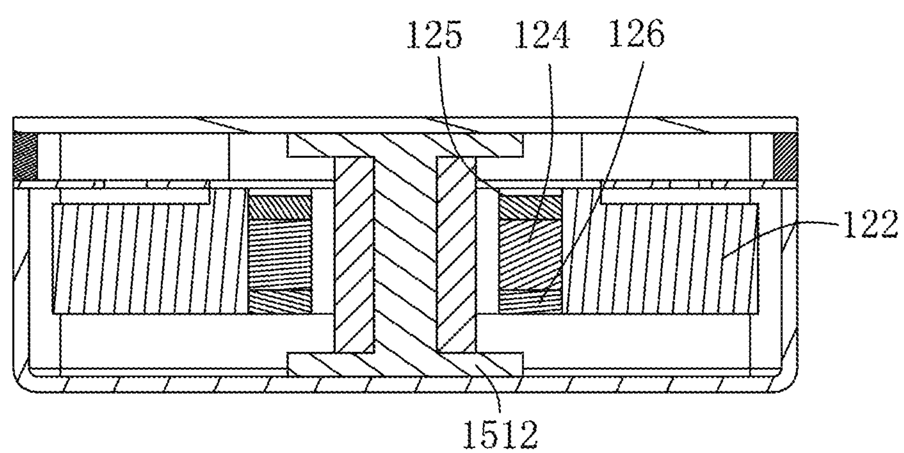
FIG. 7 is a sectional view taken along B-B line in FIG. 5.

With reference to FIGS. 5-7, the vibration unit 120 in the linear vibration motor 200 provided by the embodiment further includes a first magnetic conductive sheet 125 and a second magnetic conductive sheet 126 that are respectively located on an upper surface and a lower surface of the permanent magnet 124 (the upper surface and the lower surface of the permanent magnet 124 are two ends respectively close to the two iron core propping portions 1512). In this embodiment, a magnetic circuit structure adopts a permanent-magnet array structure, such that the mass 122 is subject to a larger driving force. Thus, the linear vibration motor 200 has a higher response speed.

Compared with the related art, the linear vibration motor provided by the present disclosure has the following advantages: as the iron core is provided, the coil is wound on the iron core body portion of the iron core; as the iron core is provided with the iron core propping portion that is right opposite to the permanent magnet, when current enters the coil, the magnetic fields of the coil and the permanent magnet interact to produce the Lorentz force so as to drive the vibration unit to vibrate; meanwhile, the iron core propping portion will generate magnetism to act upon the permanent magnet; the Lorentz force produced between the permanent magnet and the energized coil and the acting force between the energized and magnetized iron core propping portion and the permanent magnet are superposed to increase the driving force for driving the vibration unit to vibrate; and thus, the linear vibration motor has a higher response speed.

The above descriptions are only preferred embodiments of the present disclosure. It should be noted here that improvements that may be made by those of ordinary skill in the art without departing from the inventive concept of the present disclosure should fall within the scope of protection of the present disclosure.

What is claimed is:

1. A linear vibration motor, comprising:

a housing with a receiving space;

a vibration unit received in the receiving space;

an elastic module through which the vibration unit is suspended in the receiving space; and a driving unit that drives the vibration unit to vibrate, wherein the vibration unit comprises a mass with a through hole and a permanent magnet mounted in the through hole, the driving unit comprises an iron core fixedly mounted in the housing and passing through the through hole and a coil wound on the iron core, the iron core comprising an iron core body portion passing through the through hole and two iron core propping portions formed by extending respectively from two ends of the iron core body portion in a direction facing away from a central axis of the iron core body portion, the coil being wound on the iron core body portion, a side of the permanent magnet close to the coil and a side of the permanent magnet close to the mass have opposite magnetic polarities, and after the coil is energized, the two iron core propping portions have opposite magnetic polarities, the vibration unit further comprises a permanent-magnet holder mounted in the through hole, the permanent-magnet holder comprises a rectangular penetration hole located in a center of the permanent-magnet holder and a mounting groove formed by recessing from an inner wall of the penetration hole in a direction facing away from a central axis of the penetration hole, and the permanent magnet is embedded into the mounting groove.

2. The linear vibration motor as described in claim 1, wherein four mounting grooves are provided, the four mounting grooves are respectively distributed in four inner walls of the penetration hole in an array; and four permanent magnets are provided, and the four permanent magnets are disposed at intervals and correspondingly embedded into the four mounting grooves.

3. The linear vibration motor as described in any of claim 2, further comprising a first magnetic conductive sheet and a second magnetic conductive sheet that are respectively located on an upper surface and a lower surface of the permanent magnet.

4. The linear vibration motor as described in any of claim 1, further comprising a first magnetic conductive sheet and a second magnetic conductive sheet that are respectively located on an upper surface and a lower surface of the permanent magnet.

5. The linear vibration motor as described in any of claim 1, further comprising a first magnetic conductive sheet and a second magnetic conductive sheet that are respectively located on an upper surface and a lower surface of the permanent magnet.

6. The linear vibration motor as described in claim 1, wherein the iron core propping portion comprises a body portion connected to the iron core body portion and an extension portion formed by extending from a side edge of the body portion in a direction facing away from a center of the body portion, and an orthographic projection of the extension portion on the permanent magnet is at least partially located on the permanent magnet.

7. The linear vibration motor as described in claim 1, further comprising a baffle connected to the housing and configured to fix the elastic module.

8. The linear vibration motor as described in claim 7, wherein the elastic module comprises a fixed portion fixedly connected to the mass, a connection portion fixedly connected to the baffle and a deformation portion connecting the fixed portion with the connection portion.

9. The linear vibration motor as described in claim 8, wherein the housing comprises a first housing with a side wall and a second housing connected to and covering the first housing, a groove that receives the baffle is formed in the side wall of the first housing, the connection portion of the elastic module is sandwiched between the baffle and a bottom of the groove, four baffles are provided, correspondingly, four grooves are provided, and the four baffles are respectively distributed in the four grooves in the side wall in an array.

10. The linear vibration motor as described in claim 1, wherein the permanent magnet is a magnet ring.

11. The linear vibration motor as described in claim 1, wherein the mass is made of a non-permeability magnetic material.

* * * * *